Oct. 17, 1961 E. A. GLYNN 3,004,587
TIRE DRIVE UNIT FOR A TIRE DETREADING MACHINE
Original Filed April 1, 1957 2 Sheets-Sheet 1

INVENTOR.
Edwin A. Glynn
BY
Webster & Webster
ATTYS.

Oct. 17, 1961   E. A. GLYNN   3,004,587
TIRE DRIVE UNIT FOR A TIRE DETREADING MACHINE
Original Filed April 1, 1957   2 Sheets-Sheet 2
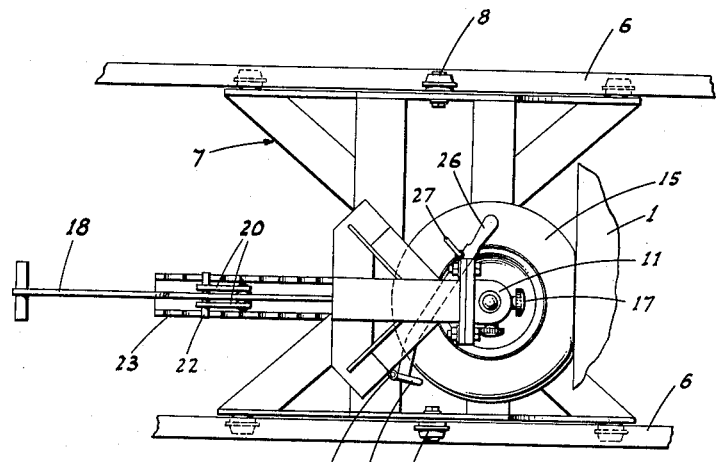
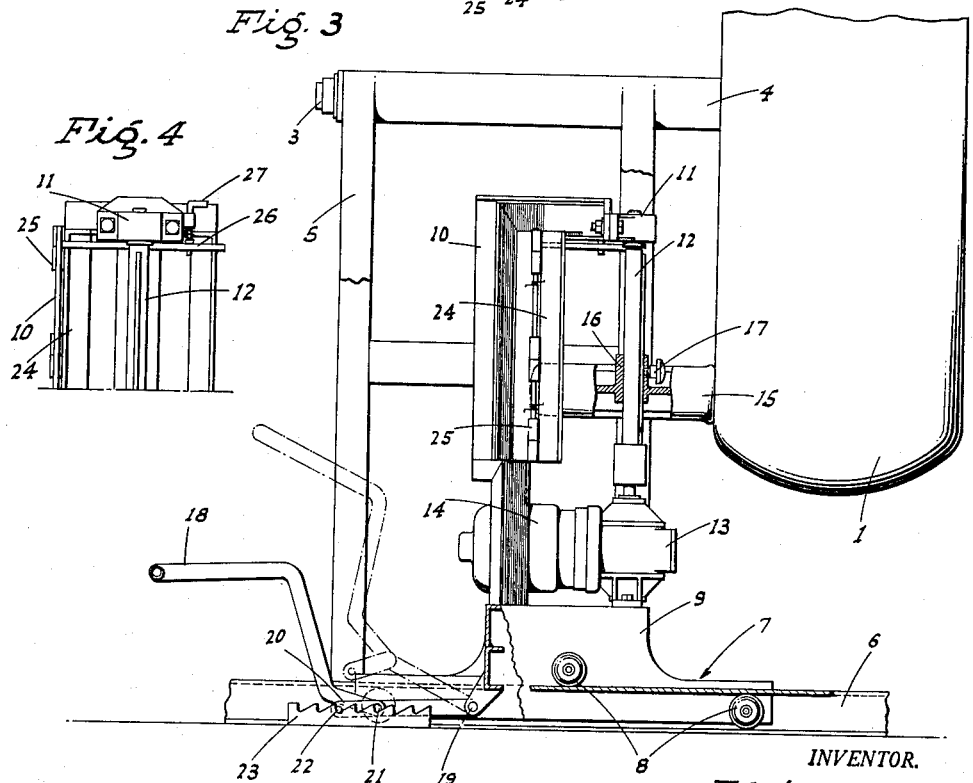
INVENTOR.
Edwin A. Glynn
BY
Webster & Webster
ATTYS.

United States Patent Office 3,004,587
Patented Oct. 17, 1961

3,004,587
TIRE DRIVE UNIT FOR A TIRE
DETREADING MACHINE
Edwin A. Glynn, Lodi, Calif., assignor to Super Mold Corporation of California, Lodi, Calif., a corporation of California
Original application Apr. 1, 1957, Ser. No. 650,050, now Patent No. 2,941,584, dated June 21, 1960. Divided and this application Mar. 7, 1960, Ser. No. 13,300
7 Claims. (Cl. 157—13)

This invention relates to a device for driving a tire mounted on the supporting rim provided as part of a tire detreading machine, and is a division of copending application, Serial No. 650,050, filed April 1, 1957, which became Patent No. 2,941,584.

This machine is particularly designed to handle large and heavy tires such as those used on wheeled earth moving equipment and the like, and is for the purpose of removing the worn tread rubber from such tires, and for then applying new camelback thereto for a recapping operation.

Due to the inherent stiffness of these large and heavy tires, it is unnecessary to inflate the same in order to perform an efficient detreading operation thereon, and consequently the tires do not engage the supporting rim with sufficient frictional pressure to enable the tire to be driven or rotated by a driving force applied at the beads of the tire.

It is therefore the principal object of the present invention to provide a driving unit for such a rim-mounted tire which includes a rotary member frictionally engaging one side wall of the tire in rotating or driving relation.

The tires being handled are of course apt to be of different over-all diameters and cross-sectional widths, and a further object of this invention is to mount the rotary tire engaging member so that it may be adjusted in position, either radially or laterally of the tire independently, so as to properly engage the tire regardless of its size.

The above recited rotary member is also adapted to be used to control the rotation of the tire when new tread rubber or camelback is being applied, and another object of this invention is to provide normally inactive manually controlled means to hold said member, and consequently the tire, against rotation at any time desired, as when the new tread rubber or camelback is being manually applied to the tire.

Another object of the invention is to provide a practical, reliable, and durable tire drive unit for a tire detreading machine, and one which will be exceedingly effective for the purpose for which it is designed.

These objects are accomplished by means of such structure and relative arrangement of parts as will fully appear by a perusal of the following specification and claims.

In the drawings:

FIG. 2 is a top plan view of the tire driving unit and the included carriage.

FIG. 3 is a side elevation of the same, partly in section and shown in connection with certain parts of the detreading machine.

FIG. 4 is a fragmentary end elevation of the driving unit, looking away from the tire.

Figure 1:
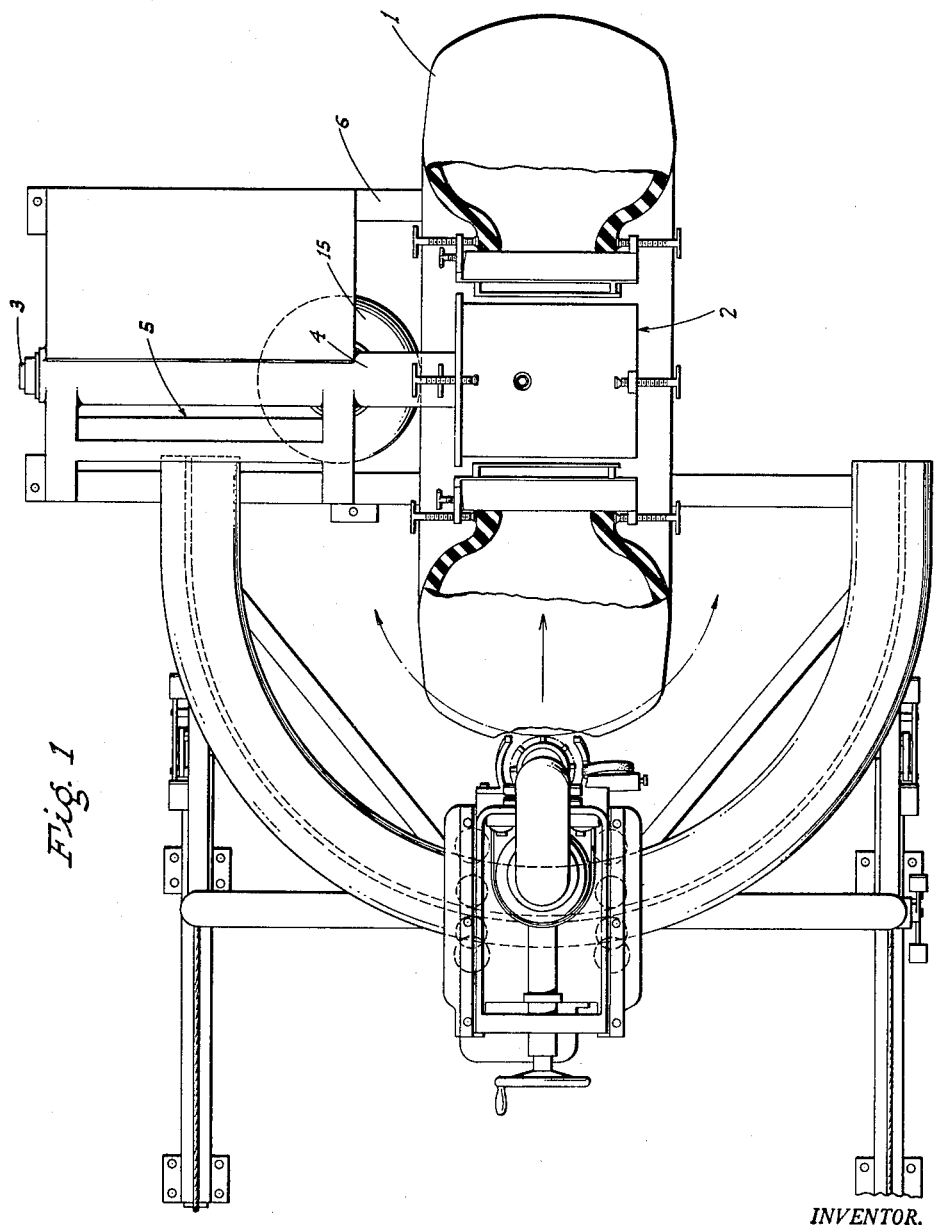
FIG. 1 is a top plan view of the tire detreading machine as in use, and showing the tire driving unit associated therewith.

Referring now more particularly to the drawings, and to the characters of reference marked thereon, the tire to be detreaded is indicated at 1; such tire being supported, with its axis horizontal, on a bead-engaging, radially adjustable rim assembly 2.

This assembly is mounted on an axial spindle 3 turnable in a sleeve 4 which is included as a part of the fixed upstanding skeleton frame 5 of the machine. This frame is disposed laterally to one side of the tire, and is fixed at its lower end in connection with a pair of spaced rails 6 which extend under the tire and are parallel to the spindle 3; said rails being floor engaging and secured thereto.

As shown particularly in FIGS. 2 and 3, a carriage 7 is supported on the rails 6, for movement along the same, by means of rollers 8 on each side of the carriage and which engage above and below the top flanges of the related rails 6.

The carriage 7 includes, within the confines of the frame 5, a centrally disposed base or pedestal 9 projecting above the rails 6, and a frame 10 mounted on and upstanding from the base at the end thereof furthest from the tire. Said frame is fitted at its upper end with a journal 11 for the upper end of a vertical shaft 12 which extends downwardly some distance to connection with the vertical output shaft of a reduction gear box 13 driven by an electric motor 14. The motor and gear box together form a single unit which is mounted on the pedestal 9.

A rubber-tired friction drive wheel 15 includes a peripherally yieldable outer member for tire engagement and a metal hub 16 which is slidably keyed on the shaft 12 and held at any desired adjusted position therealong by a hand set-screw 17.

The wheel is thus adjusted, and according to the size of the tire 1, so as to engage the adjacent side of the same squarely and in driving relationship when the carriage is suitably advanced.

The wheel 15 is driven in a direction such that the tire is rotated to turn upwardly on what may be termed the front, as shown by the arrow in FIG. 1.

The carriage 7 is manually controlled in its movement, either toward or from the tire, by a centrally disposed push-pull hand lever 18 which is pivoted at one end on the carriage at a low point thereon, as at 19, and extends thence in a direction away from the tire, and under frame 5 to a termination beyond said frame at a level convenient for engagement by the operator, as shown in FIG. 3.

A link unit 20 is pivoted at one end on the lower portion of the lever intermediate the ends of such portion, as shown at 21; the link unit hanging back relative to the lever pivot 19 at an angle to the adjacent position of the handle lever, as shown in dotted lines in FIG. 3, and at its free end carrying a cross pin 22.

A ratchet bar 23, with the notches thereof facing in the direction of the tire, is mounted between and parallel to the rails 6 in position to be engaged by the cross pin 22 upon the handle lever 18 being lowered. In operation, said handle lever is first swung to a raised position, as shown in dotted lines in FIG. 3. This places the upper end of the handle lever at a level where it may be conveniently grasped by the operator, and also clears the cross pin 22 from the ratchet bar 23 so that the carriage 7 may be either pushed or pulled, by handle-lever manipulation, without restraint.

After the carriage is advanced until the drive wheel 15 engages the tire 1, the handle lever is lowered until the cross pin 22 engages one of the notches in the rachet bar 23. The lever 18 is then further lowered until the link unit 20 is in a beyond-dead-center position. This movement which locks the lever, and of course the carriage, against retractive movement is accompanied by a further advance of the carriage which presses the wheel 15 into forceful driving engagement with the side of the tire. Upon the motor 14 being placed in operation the tire will be rotated, as will be evident, and the detreading of the tire, or the application of new camelback thereto, as the case may be, may then be carried out.

During the course of the latter operation it is desired that the tire shall be held against rotation in certain positions, and this is accomplished—after the motor 14 is shut off—in the following manner:

The upper portion of the carriage-mounted frame 10 is fitted with a vertical, normally spring-retracted brake plate 24 hinged to said frame, as at 25, adjacent and for swinging motion toward the tread of the friction drive wheel 15. At its upper end the brake plate 24 is secured to a horizontal hand lever 26 disposed immediately below the shaft journal 11 and extending to a termination a short distance beyond the same, as shown in FIG. 2.

Upon swinging the lever 26 in the appropriate direction the brake plate 24 is caused to bind against the stationary drive wheel 16. The lever 26 is then latched or held against movement by a suitable latch device 27, mounted on the frame 10, and which device may also be used to hold the lever in its inoperative position so that the brake plate cannot be accidentally applied against the wheel 15.

As will be seen from FIG. 3, the brake plate 24 extends parallel to the wheel drive shaft 12 for the full length of possible adjustment of the wheel along the shaft. This of course enables the wheel to be braked regardless of the position of the wheel along the shaft.

By manipulating the latch 25 and lever 24, the operator can effectively secure the wheel 15 and tire 1 against rotation during the manual application of the camelback; it being the practice to manually apply a portion of the camelback strip, which is continuous, to then part-rotate the wheel, and then lock it for the application of a further portion of the camelback strip. This is repeated step by step until the camelback fully encircles the tire.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a tire detreading machine, a rotary horizontal-axis tire mounting rim assembly, a tire-tread working tool positioned for engagement with the tread of a mounted tire as the latter rotates, a friction wheel engaging the tire on one side thereof, a relatively long driven shaft disposed radially on the axis of the rim assembly and on which shaft the wheel is slidably but nonturnably mounted, means to hold the wheel in any position of adjustment along the shaft, and manually actuated brake means disposed to engage and hold the wheel against rotation in any adjusted position of said wheel; said brake means including a wheel brake plate extending parallel to the shaft for the length of adjusting movement of the wheel along the shaft.

2. In a tire detreading machine, a tire-supporting rim assembly, means supporting the assembly for unrestrained rotation and with its axis horizontal, a friction driving wheel mounted relative to said supporting means to engage a sidewall of the tire in driving relation and with the axis of the wheel radially of the tire, manually controlled means to drive the wheel, said drive means being arranged to allow of unrestrained rotation of the tire by hand when the wheel is in engagement with the tire and the drive means is inactive, a normally released brake for the wheel, a manually actuated lever connected to the brake to apply the same, and means applied to the lever to lock the same against movement in a brake releasing direction.

3. In a tire detreading machine, a tire-supporting rim assembly, means supporting the assembly for unrestrained rotation and with its axis horizontal, spaced rails fixed below and to one side of the supported tire and parallel to the axis thereof, a carriage supported by and movable along the rails, hand means to control such movement, the carriage including an upstanding pedestal, a frame upstanding from the pedestal at the end thereof furthest from the tire, a vertical shaft between the frame and tire and disposed radially of the axis of the tire, a friction driving wheel to contact the adjacent side wall of the tire at the bottom, said wheel being adjustably fixed on the shaft, a journal fixed on the frame for the upper end of the shaft, and a drive unit for the shaft mounted on the pedestal and connected to the lower end of the shaft.

4. In a tire detreading machine, a tire-supporting rim assembly, means supporting the assembly for unrestrained rotation and with its axis horizontal, spaced rails fixed below and to one side of the supported tire and parallel to the axis thereof, a carriage supported by and movable along the rails, a friction driving wheel mounted on the carriage for driving engagement with the adjacent side wall of the tire at the bottom upon advance of the carriage, a handle lever projecting rearwardly from the carriage and pivoted at its forward end on the carriage adjacent the level of the rails, the initial portion of the lever being substantially horizontal while the rearmost portion is elevated for convenient hand engagement and manipulation, a link pivoted at its forward end on said forward portion of the lever and depending therefrom at an acute angle thereto, said link being arranged for upward swinging movement from such depending portion, a cross pin on the lower end of the link, and a fixed ratchet bar parallel to the rails and having notches to receive the cross pin upon downward swinging of the handle lever to said lowered position; the link pivot being below dead-center relative to the pin and lever pivot when the lever is in a fully lowered position.

5. In a tire detreading machine, a tire supporting rim assembly, means supporting the assembly for unrestrained rotation and with its axis horizontal, spaced rails fixed below and to one side of the supported tire and parallel to the axis thereof, a carriage supported by and movable along the rails, a friction driving wheel mounted on the carriage for driving engagement with the adjacent sidewall of the tire at the bottom upon advance of the carriage, a handle lever projecting rearwardly from the carriage and pivoted at its forward end on the carriage to advance and retract the carriage toward and from said tire, means pivoting the lever at its forward end on the carriage for upward and downward swinging movement, and means functioning upon downward swinging of the lever to a predetermined lowered position to lock the lever, and the carriage, against retractive movement.

6. In a tire detreading machine, a rotary horizontal-axis tire mounting rim assembly, a tire-tread working tool positioned for engagement with the tread of a mounted tire as the latter rotates, a friction wheel engaging the tire on one side thereof, a relatively long driven shaft disposed radially of the axis of the rim assembly and on which shaft the wheel is slidably but non-turnably mounted, means to hold the wheel in any position of adjustment along the shaft, means to drive the shaft, and manually actuated brake means separate from the drive means to engage and hold the wheel against rotation in any adjusted position of said wheel.

7. In a tire retreading machine, a rotary horizontal-axis tire mounting rim assembly, a tire-tread working tool positioned for engagement with the tread of a mounted tire as the latter rotates, a friction wheel engaging the tire on one side thereof, a relatively long driven shaft disposed radially of the axis of the rim assembly and on which shaft the wheel is slidably but non-turnably mounted, means to hold the wheel in any position of adjustment along the shaft, means journaling the shaft adjacent its ends in an axially immovable position, and means connected to the shaft at one end thereof to drive the same.

References Cited in the file of this patent
UNITED STATES PATENTS

| | | |
|---|---|---|
| 1,426,910 | Replogle | Aug. 22, 1922 |
| 1,561,861 | Kmentt | Nov. 17, 1925 |
| 2,189,203 | Glynn | Feb. 6, 1940 |
| 2,510,601 | Pater | June 6, 1950 |
| 2,765,845 | Bullis | Oct. 9, 1956 |
| 2,783,830 | Pozerycki et al. | Mar. 5, 1957 |